United States Patent [19]

Biskup

[11] 4,133,551

[45] Jan. 9, 1979

[54] CAMBERING DEVICE FOR CAMBERING VEHICLE

[75] Inventor: Edward J. Biskup, Birmingham, Mich.

[73] Assignee: General Motors Corporation, Detroit, Mich.

[21] Appl. No.: 827,267

[22] Filed: Aug. 24, 1977

Related U.S. Application Data

[63] Continuation-in-part of Ser. No. 727,593, Sep. 28, 1976, abandoned.

[51] Int. Cl.² .............................................. B62K 5/00
[52] U.S. Cl. ..................................... 280/221; 280/772
[58] Field of Search ............... 280/87 R, 87 A, 112 R, 280/112 A, 278, 287, 6 R, 6 H, 6.1, 6.11, 200, 210, 218, 220, 221, 224, 282, 12.1, 12 H, 21 R, 21 A; 180/25 R, 26 R, 25 A, 41

[56] References Cited

U.S. PATENT DOCUMENTS

| 2,593,974 | 4/1952 | Brown | 280/21 |
| 2,771,145 | 8/1954 | Peters | 180/26 |
| 3,229,782 | 6/1964 | Hilton | 180/26 |
| 3,964,563 | 6/1976 | Allen | 180/41 |

FOREIGN PATENT DOCUMENTS

| 456843 | 9/1925 | Fed. Rep. of Germany | 280/221 |
| 4942586 | 11/1974 | Japan | 280/87 R |

Primary Examiner—Joseph F. Peters, Jr.
Assistant Examiner—Terrance L. Siemens
Attorney, Agent, or Firm—Edward J. Biskup

[57] ABSTRACT

A cambering vehicle having pivoted trailing arms and having a cambering device consisting of a crank member supported by the steering frame for rotation about an axis extending transversely to the longitudinal axis of the vehicle and having offset end portions connected to the trailing arms for controlling substantially equal and opposite movement thereof when the vehicle is leaned into a turn.

4 Claims, 5 Drawing Figures

CAMBERING DEVICE FOR CAMBERING VEHICLE

This is a Continuation-In-Part of Ser. No. 727,593, filed Sept. 28, 1976 now abandoned, in the name of Edward J. Biskup.

This invention concerns cambering vehicles and more particularly relates to a cambering device for a cambering vehicle that serves to interconnect the trailing arms to ensure that they will move in substantially equal and opposite directions when the vehicle is leaned into a turn.

More specifically, the cambering device according to the invention comprises a crank member that is mounted on the usual steering frame of a cambering vehicle for rotational movement about an axis that extends transversely to the longitudinal axis of the vehicle. The crank member includes an elongated body portion which terminates at the opposed ends thereof with offset legs which extend in opposite directions and are located in slots formed in the trailing arms the front ends of which are pivoted to the steering frame. A bracket, which is rigid with the steering column, serves as a support for the body portion of the crank member and includes a releasable lock device which permits the steering frame to be rotated to a position adjacent the trailing arms so as to provide a compact package that can be readily stowed.

The objects of the present invention are to provide a new and improved cambering device for a cambering vehicle that includes a crank member which interconnects the trailing arms and that is located in the plane of the trailing arms when the latter are horizontally aligned; to provide a new and improved cambering device for a cambering vehicle that is supported by the steering frame adjacent the pivotal connection with the trailing arms and serves to ensure substantially equal and opposite movement of the arms; to provide an improved cambering device that consists of a single member in the form of a crank having offset ends which extend into slots located in the sides of the trailing arms for controlling pivotal movement thereof; and to provide a new and improved cambering device which limits relative pivotal movement of the trailing arms when the vehicle is leaned into a turn.

Other objects and advantages of the present invention will be more apparent from the following detailed description when taken with the drawings in which.

Figure 1:
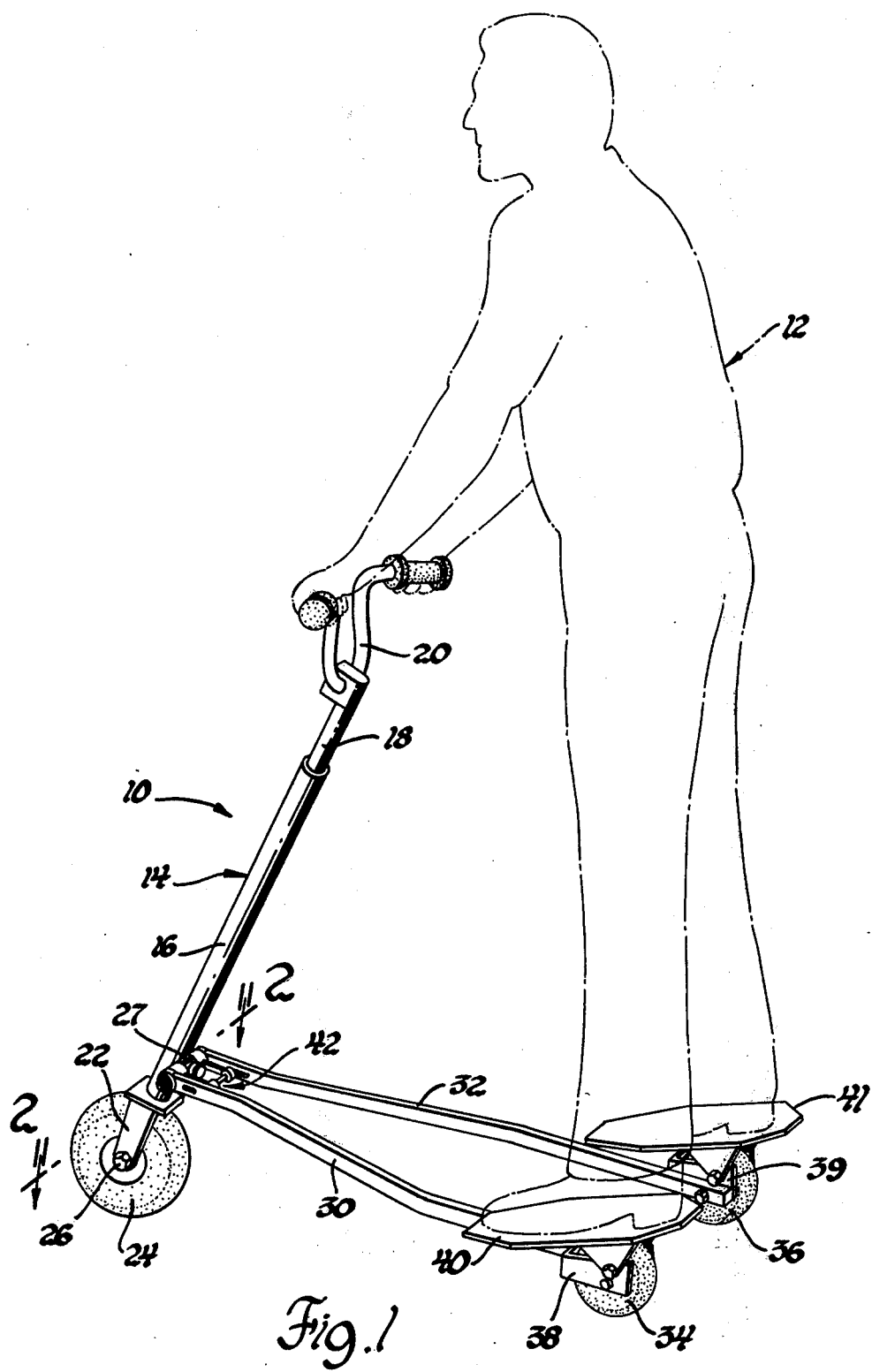
FIG. 1 is a perspective view showing a cambering vehicle incorporating a cambering device made in accordance with the invention.

Referring to FIG. 1 of the drawings, a cambering vehicle 10 is shown which is adapted to be propelled forwardly by the natural input of a vehicle operator 12 through the timed shifting of his weight from one foot to the other coordinated with the left and right cambered steering of the vehicle in a sinuous path. It will be noted that a vehicle of this type can be seen in copending patent application, Ser. No. 649,967 filed on Jan. 19, 1976, now U.S. Pat. No. 4,087,106, and entitled "Cambering Vehicle" and reference is made to such application for a full understanding of how the vehicle is operated. It will also be noted that although a manually propelled vehicle is shown, an internal combustion engine or an electric motor can be combined with the vehicle for driving the front wheel thereof.

Figure 2:
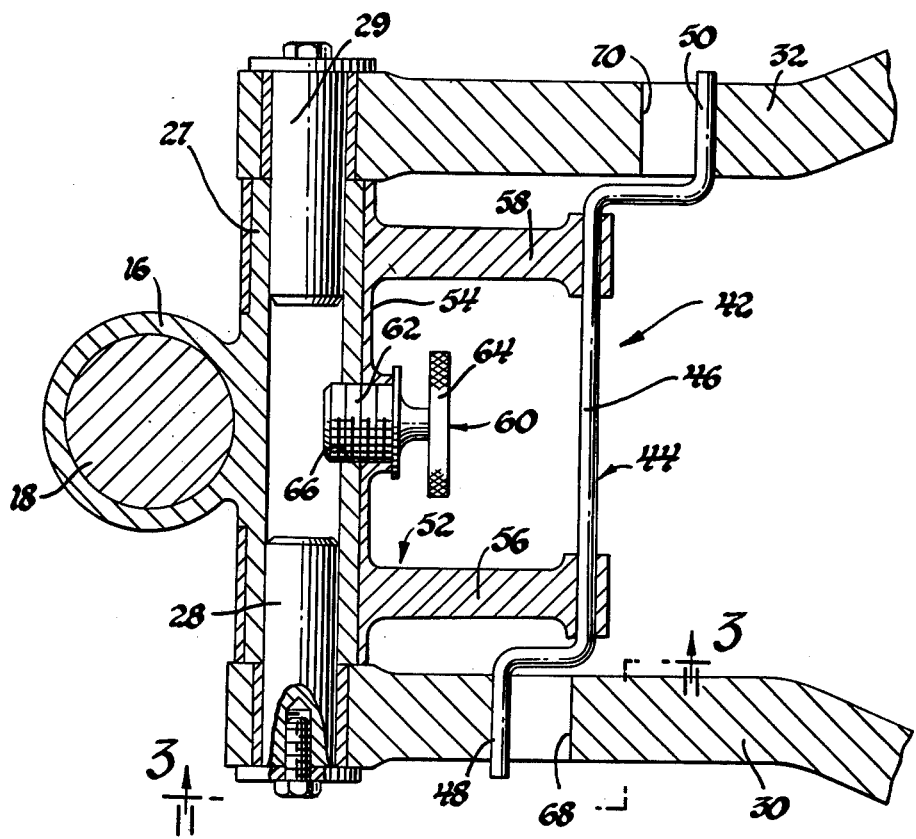
FIG. 2 is an enlarged sectional view taken on line 2-2 of FIG. 1 showing the cambering device according to this invention connecting the trailing arms of the cambering vehicle.

The cambering vehicle 10 comprises a steering frame 14 which includes a tubular column 16 which serves to axially align and rotatably support an elongated steering shaft 18 which extends therethrough. The upper end of the steering shaft 18 is provided with a handlebar assembly 20 while the lower end is formed with a fork 22 which rotatably supports the front wheel 24 of the vehicle. The wheel 24 rotates on an axle 26 which extends transversely through and is supported by the fork 22. As seen in FIG. 2, the lower end of the tubular column 16 is rigidly formed with a transverse tube 27, the outer ends of which fixedly support axially aligned stub shafts 28 and 29. The respective stub shafts 28 and 29 pivotally support the front ends of a pair of trailing arms 30 and 32 which extend rearwardly and terminate with rear wheels 34 and 36 respectively supported for rotation by a pair of brackets 38 and 39, which in turn, pivotally support foot pads 40 and 41.

Figure 3:
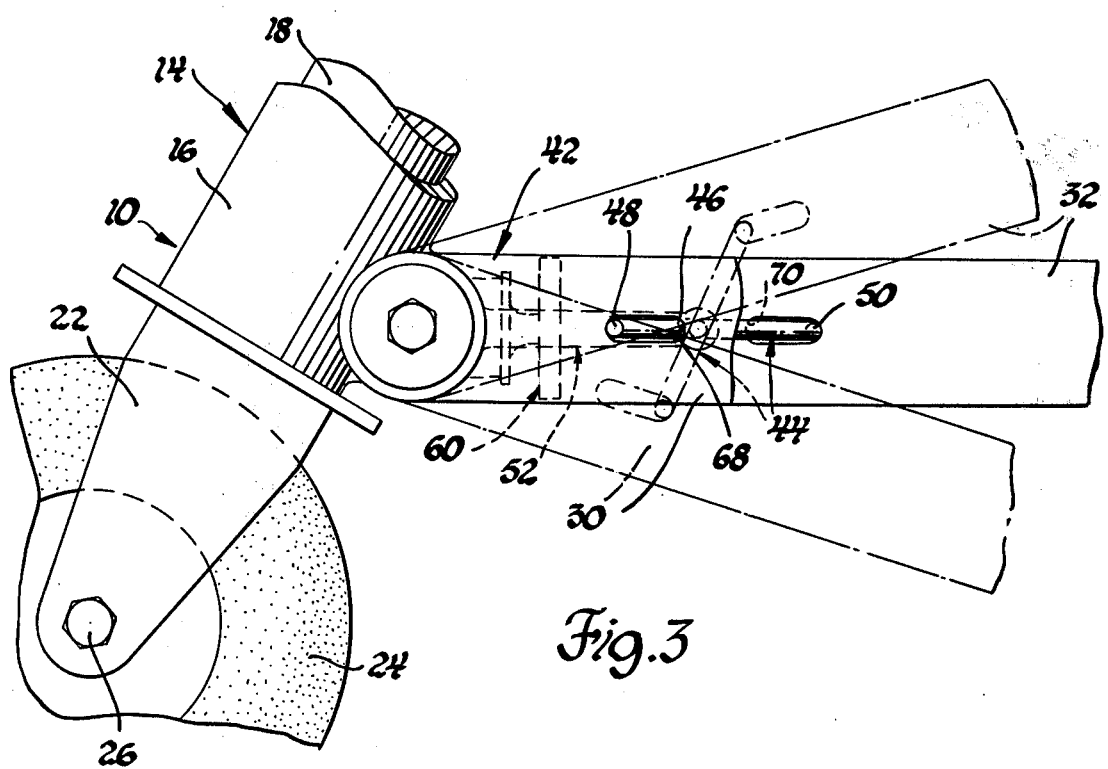
FIG. 3 is a side elevational view of the cambering device taken on line 3—3 of FIG. 2.

A cambering device 42 made according to the invention serves to interconnect the trailing arms 30 and 32 and, ensures that the pivotal movement of the trailing arms 30 and 32 about stub shaft 28 and 29 is substantially equal and opposite. Thus, when the vehicle 10 is leaned into a turn, all wheels remain in contact with the ground and camber by an amount substantially equal to vehicle roll. More specifically, and as seen in FIGS. 2 and 3, the cambering device 42 comprises a crank member 44 having an elongated straight body portion 46 which terminates at the opposite ends thereof with offset laterally outwardly extending legs 48 and 50. The body portion 46 of the crank member 44 is supported for rotation by a bracket 52 that includes a sleeve portion 54 supported by the transverse tube 27 fixed with the steering column 16. The sleeve portion 54 is integrally formed with a pair of rearwardly extending arms 56 and 58 which serve to rotatably support the body portion 46 for rotation about an axis parallel to the longitudinal center axis of the stub shafts 28 and 29.

A lock device 60 consisting of a screw member 62 and an integral knob 64 is threadably carried by the sleeve portion 54 and is intended to extend within an aligned threaded bore 66 in the tube 27 when the arms 56 and 58 of the bracket 52 and the steering frame 14 are located in the relative positions shown in FIG. 3. The screw member will extend into the bore 66 when the knob 64 is rotated so as to advance the screw member towards the steering column. Thus, in the position of FIGS. 1, 2 and 3, the bracket 52 is fixed with the steering column 16 and can be released therefrom so as to permit rotation of the steering column about the tube 27 when the knob 64 is rotated so as to withdraw the screw member 62 from the threaded bore 66.

The legs 48 and 50 of the crank member 44 extend into elongated slots 68 and 70 formed in the trailing arms 30 and 32, respectively. As seen in FIG. 3, each of the slots 68 and 70 has the major axis thereof extending substantially parallel to the longitudinal center axis of the associated trailing arm. Thus, with the trailing arms 30 and 32 aligned in a horizontal plane as seen in full lines in FIG. 3, the crank member 44 is similarly located in a horizontal plane and the leg 48 is located at the front end of the slot 68 while the leg 50 is located at the rear of the slot 70. As a result and with reference to the disclosure in FIGS. 1 and 3, when the steering frame 14 of the vehicle 10 is leaned into a right-hand turn, the trailing arm 32 will rotate in a counterclockwise direction about the stub shaft 29 while the trailing arm 30 will rotate in a clockwise direction about the stub shaft 30. This movement is controlled through the legs 48 and 50 of the crank member 44 due to the offset relationship of each and the fact that the legs extend in opposite directions forwardly and rearwardly. In other words, when the trailing arm 32 moves in a counterclockwise direction in FIG. 3 from the full line position to the phantom line position, the leg 50 rotates about the longitudinal center axis of the body portion 46 and moves forwardly in the slot 70. Such movement causes the trailing arm 30 to be rotated clockwise about stub shaft 28 from the full line position to the phantom line position by the counterclockwise rotation of the leg 48 about the aforesaid longitudinal center axis of the body portion 46. When the vehicle 10 is leaned into a left-hand turn, it should be apparent that the crank member 44 will control relative pivotal movement of the trailing arms 30 and 32 as they move in opposite directions. In addition, the size of each slot 68 and 70 is such that relative up and down movement of the trailing arms 30 and 32 is limited to the phantom line positions shown so as to prevent the forward ends of the trailing arms from contacting the support surface when the vehicle 10 is leaned into a turn.

From the above, it should be apparent that movement of one trailing arm about the associated stub shaft will result in substantially equal and opposite movement of the other trailing arm about its stub shaft. In this regard, it will be noted that the offset of leg 50 from the body portion 46 is greater than the offset of leg 48. This is required in this instance in order to compensate for the difference in the distance between the pivot axis of trailing arm 30 and the leg 48 and the pivot axis of trailing arm 32 and leg 50. This ensures that the cambering device 42 provides substantially equal and opposite angular rotation of the trailing arms 30 and 32. In this connection and as seen in FIG. 3, the distance from the longitudinal center axis of the stub shafts 28 and 29 to the longitudinal center axis of the body portion 46 is 2.00 inches and the trailing arms 30 and 32 have a maximum angular separation of 34°. With this arrangement, it has been found that an offset of 2.17 inches from the longitudinal center axis of leg 50 to the longitudinal center axis of body portion 46, and an 0.80 inch offset of leg 48 measured from the longitudinal center axis of the body portion to the longitudinal center axis of the leg 48 will provide substantially equal and opposite movement of the trailing arms 30 and 32 throughout the range of relative movement of the trailing arms. It has also been determined that if the offset of the arm 50 is increased to 5.50 inches with the offset of arm 48 being 0.90 inches, improved relative movement of trailing arms 30 and 32 is realized.

In addition, it will be noted that by releasing the lock device 60 so as to free the bracket 52 from the tube 27 as afore-described, the steering frame 14 can be rotated about the tube 27 and collapsed towards the trailing arms 30 and 32. It will be understood that when the steering frame 14 is in the collapsed position, the screw member 62 can be advanced into frictional engagement with the tube 27 so the trailing arms 30 and 32 will be locked to the steering frame 14 to provide a compact configuration that can be stowed readily.

Figure 4:
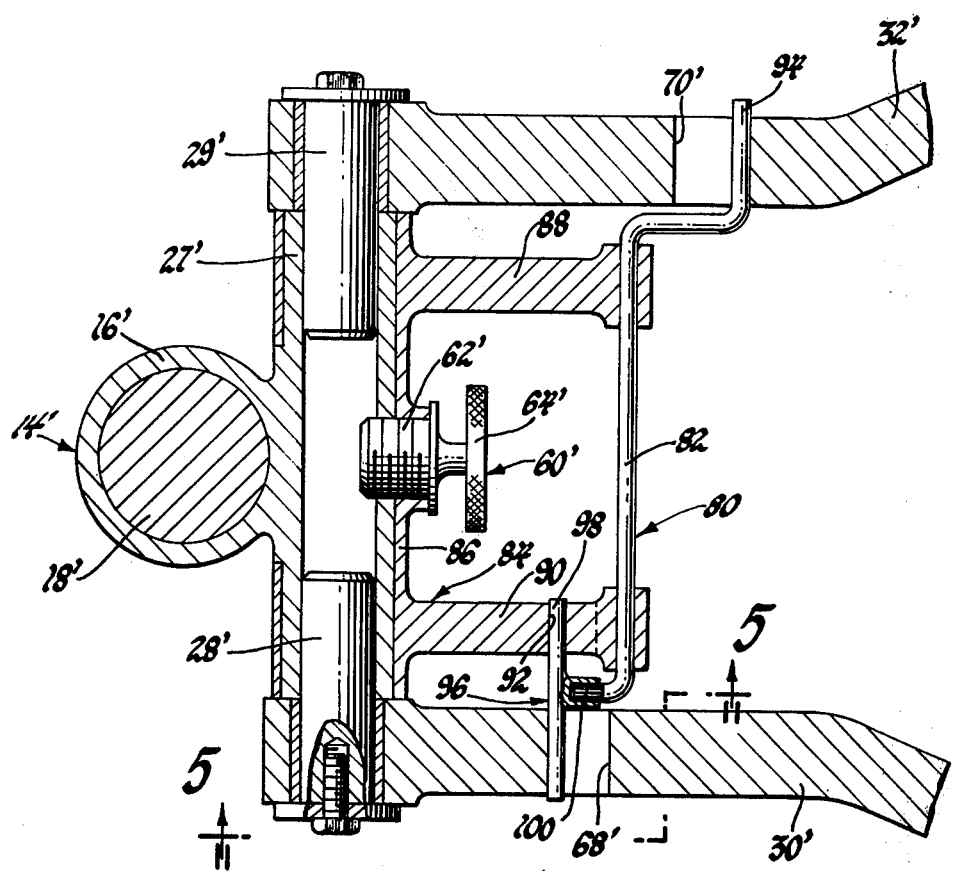
FIG. 4 is a modified form of the invention.
Figure 5:
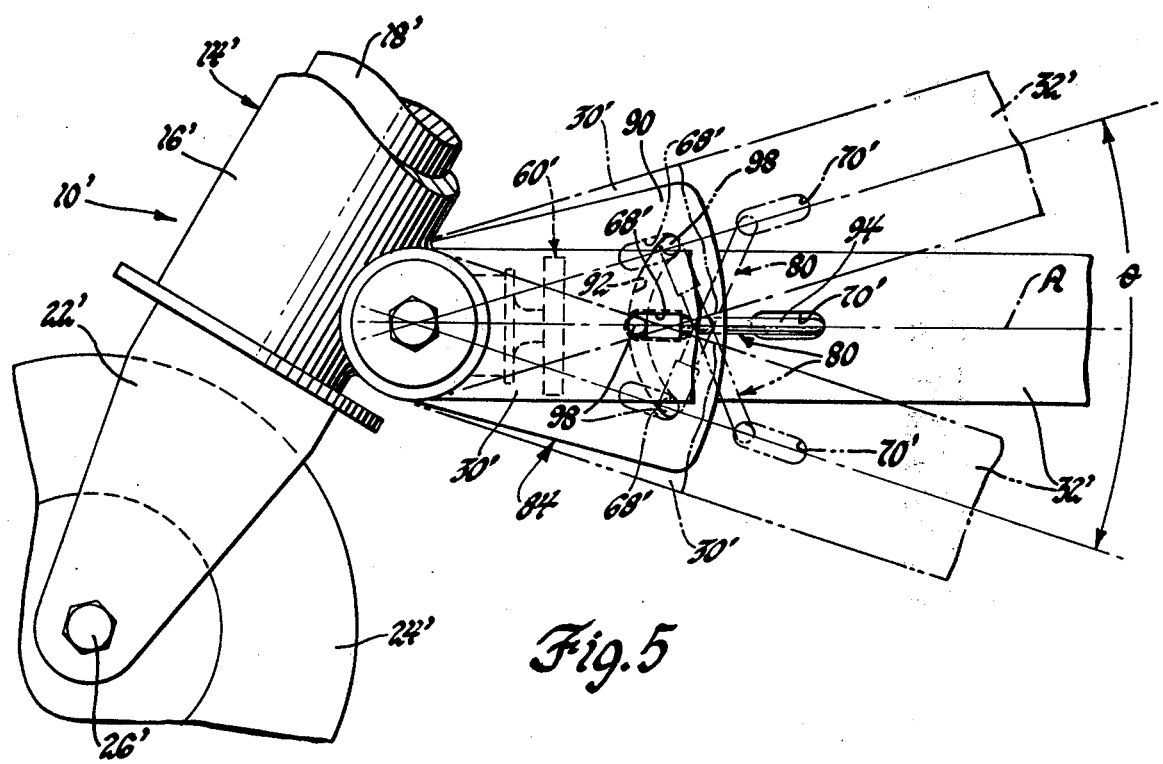
FIG. 5 is a side elevational view of cambering device shown in FIG. 4 and taken on line 5—5 thereof.

FIGS. 4, 5 and 6 show a modified form of the invention with the parts that are identical to the parts incorporated in the invention as shown in FIGS. 1-3 being identified with identical reference numerals but primed. This form of the invention allows the legs of the crank member to be offset a minimum distance from the body portion of the crank member and still realize substantially equal and opposite movement of the trailing arms 30′ and 32′.

More specifically, it will be noted that the crank member 80 includes a body portion 82 supported for rotation about its longitudinal center axis by a bracket 84 that is similar to the bracket 52 employed with the invention as shown in FIGS. 1-3. The bracket 84 has a sleeve portion 86 that is mounted on the transverse tube 27′ fixed with the steering column 16′. The sleeve portion is integrally formed with a pair of rearwardly extending arms 88 and 90 which serve to rotatably support the body portion 82 of the crank member 80. The arm 88 is identical to the arm 58 of the device shown in FIGS. 1-3, but the arm 90 is enlarged in the vertical direction so as to provide space for a guide slot 92 for purposes to be explained hereinafter.

The crank member 80 has its body portion 82 formed at one end with an offset leg 94 and the other end formed with an offset leg 96. The leg 94 is integral with the body portion 82 and has the end thereof extending into a slot 70′ formed in the trailing arm 32′. The leg 96, on the other hand, is "T" shaped and consists of a cross bar member 98 one end of which extends into the guide slot 92 in arm 90 and the other end of which extends into the slot 68′ in the trailing arm 30′.

The cross bar member 98 is integrally formed with a sleeve which serves to connect the leg 96 to the body portion 82 through a spline connection 100. The spline connection 100 allows the leg 96 to move towards and away from the body portion 82. Thus, as the trailing arms 30′ and 32′ move in opposite directions about the stub shafts 28′ and 29′, the leg 96 moves within the guide slot 92 and together with the leg 94 controls the opposite movement of the trailing arms 30′ and 32′ so as to provide substantially equal and opposite movement thereof. This arrangement as alluded to hereinbefore, allows the offset of leg 94 to be reduced relative to the offset of the leg 96. In this regard and as seen in FIG. 5, the distance from the longitudinal center axis of the stub shafts 28′ and 29′ to the longitudinal center axis of the body portion 46 is 2.00 inches which is the same as provided in the invention as seen in FIG. 3. Similarly, the maximum angular separation of the trailing arms 30′ and 32′ in both directions and as indicated by the angle $\theta$ is 34 degrees, with the longitudinal center axis of each trailing arm being positioned at an angle of 17 degrees relative to the horizontal axis indicated by letter "A". With this arrangement, substantial equal and opposite movement of the trailing arms 30′ and 32′ is realized with the leg 94 having an offset dimension of 0.75 inches as measured from the longitudinal center axis of the leg 94 to the longitudinal center axis of the body portion 82. The center of the guide slot 92 is located on a circle having a radius of 0.90 inches with the center of the circle located on the horizontal axis A as seen in FIG. 5. The guide slot 92 thus causes the leg 96 to have a variable offset as the trailing arms 30′ and 32′ move in opposite directions. With the trailing arms 30′ and 32′ horizontally aligned as seen in full lines in FIG. 5, the distance between the longitudinal center axis of the cross bar member 98 and the longitudinal center axis of the body portion would be 0.47 inches. When the trailing arms 30' and 32' move in the phantom line positions of FIG. 5, the longitudinal center axis of the leg 96 moves along the aforementioned circle under the guidance of the slot 92 and the latter mentioned distance increases to 0.60 inches. As should be apparent, the variable offset of the leg 96 occurs because the cross bar member 98 has one end thereof positioned in the guide slot 92 which is located along an arc having a radius greater than the offset of the leg 96 when the latter is in the full line position of FIG. 5. Moreover, it has been found that by using the variable offset design as explained above, the offset of leg 94 can be made substantially less than required with the invention as seen in FIGS. 1–3 and still realize the desired relative movement of the trailing arms 30' and 32' so as to permit the vehicle to camber when it is leaned into a turn.

Finally, it will be noted that the major axis of each slot 68' and 70' is located along the longitudinal center axis of the associated trailing arms 30' and 32'. Also, as in the case of the slots 68 and 70 formed in the trailing arms of the invention as shown in FIGS. 1–3, the slots 68' and 70' are sized so as to accommodate the legs 94 and 96 of the crank member 80 and provide the movement of the trailing arms 30' and 32' as explained above.

Various changes and modifications can be made in this construction without departing from the spirit of the invention. Such changes and modifications are contemplated by the inventor and he does not wish to be limited except by the scope of the appended claims.

What is claimed is:

1. In combination with a cambering vehicle having an upright steering column supporting a pair of rearwardly extending trailing arms for pivotal movement about a first axis which extends transversely to the longitudinal axis of the vehicle, a mechanical cambering device for interconnecting the trailing arms so they move in substantially equal and opposite directions relative to the steering column when the vehicle is leaned into a turn, said cambering device comprising an elongated body portion, a bracket carried by said steering column for supporting said body portion for rotation about a second axis spaced rearwardly from said first axis and extending transversely to the longitudinal axis of said vehicle, said body portion terminating with a pair of opposed ends offset from said body portion and one of which being located adjacent one of said trailing arms and the other of which being located adjacent the other of said trailing arms, one of said opposed ends being offset an amount greater than the other of said opposed ends, and pin and slot connecting means joining each end of said body portion to an associated trailing arm so that pivotal movement of one of said trailing arms about said first axis in one direction results in said body portion being rotated about said second axis to cause the other of said trailing arms to be pivoted about the first axis in a direction opposite to said one direction.

2. In combination with a cambering vehicle having an upright steering column supporting a pair of rearwardly extending trailing arms for pivotal movement about a first axis which extends tranversely to the longitudinal axis of the vehicle, a mechanical cambering device for interconnecting the trailing arms so they move in substantially equal and opposite directions relative to the steering column when the vehicle is leaned into a turn, said cambering device comprising a crank member, a bracket carried by said steering column for supporting said crank member for rotational movement about a second axis spaced rearwardly from said first axis and extending transversely to the longitudinal axis of said vehicle, said crank member having a pair of offset legs which extend in opposite direction, one of said legs being offset from said second axis a distance greater than the other of said legs, and each of said trailing arms having a slot formed therein for receiving one of said legs so that pivotal movement of one of said trailing arms about said first axis in one direction results in said crank member being rotated about the second axis to cause the other of said trailing arms to be pivoted about the first axis in a direction opposite to said one direction.

3. In combination with a cambering vehicle having an upright steering column supporting a pair of rearwardly extending trailing arms for pivotal movement about a first axis which extends transversely to the longitudinal axis of the vehicle, a mechanical cambering device located between said pair of trailing arms for interconnecting the latter so the trailing arms move in opposite directions through substantially equal angles about their axes relative to the steering column when the vehicle is leaned into a turn, said cambering device comprising a crank member mounted on said steering column for rotational movement about a second axis spaced rearwardly from and parallel to said first axis, said crank member including an elongated body portion terminating at each end thereof with an offset leg, the leg at one end of said crank member taking the form of a cross bar having opposed ends and being movable towards and away from said body portion, a bracket normally fixed with said steering column for supporting said body portion between said pair of trailing arms for rotation about said second axis, each of said trailing arms having an elongated slot formed therein for receiving one leg of said crank member so that pivotal movement of one of said trailing arms about said first axis in one direction results in said crank member being rotated about the second axis to cause the other of said trailing arms to be pivoted about the first axis in a direction opposite to said one direction, and said bracket having a curved guide slot formed therein for receiving one of said opposed ends of said cross bar for controlling angular movement of the associated trailing arm as said trailing arms move in opposite direction.

4. In combination with a cambering vehicle having an upright steering column supporting a pair of rearwardly extending trailing arms for pivotal movement about a first axis which extends transversely to the longitudinal axis of the vehicle, a mechanical cambering device for interconnecting the trailing arms so they move in substantially equal and opposite directions relative to the steering column when the vehicle is leaned into a turn, said cambering device comprising a crank member mounted on said steering column for rotation about a second axis spaced rearwardly from said first axis and extending transversely to the longitudinal axis of said vehicle, said crank member including an elongated body portion terminating at the opposed ends thereof with L-shaped end portions which extend in opposite directions and provide a pair of laterally extending legs, one of which is offset from said body portion a distance greater than the other of said pair of legs, a bracket having a sleeve portion normally fixed with said steering column for supporting said body portion between said pair of trailing arms for rotation about said second axis, each of said trailing arms having a slot formed therein for receiving a leg of one of said L-shaped end portions so that pivotal movement of one of said trailing arms about said first axis in one direction results in said body portion being rotated about the second axis to cause the other of said trailing arms to be pivoted about the first axis in a direction opposite to said one direction, and a lock device carried by said sleeve portion of said bracket for locking the latter to the steering column for normal operation of the vehicle and for releasing said bracket from said steering column so as to allow the steering column to pivot rearwardly towards the trailing arms about said first axis into a folded position to facilitate stowage of said vehicle.

* * * * *